United States Patent [19]

Garcia

[11] 4,218,259

[45] Aug. 19, 1980

[54] POROUS SURFACE SEALING COMPOUND

[76] Inventor: Frank P. Garcia, 3047 Terrace Ave., Naples, Fla. 33940

[21] Appl. No.: 906,242

[22] Filed: May 15, 1978

[51] Int. Cl.² .................................................. C04B 7/02
[52] U.S. Cl. ...................................... 106/98; 106/104
[58] Field of Search ................................. 106/98, 104

[56] References Cited

U.S. PATENT DOCUMENTS

| | | | |
|---|---|---|---|
| 3,600,203 | 8/1971 | Aldera | 106/104 |
| 3,861,929 | 1/1975 | Deets et al. | 106/104 |

*Primary Examiner*—James Poer

[57] ABSTRACT

A porous surface sealing compound and moisture barrier, particularly for sealing gravel roofs and driveways, comprised of a properly proportioned mixture of portland cement, sand, calcium aluminate cement and water, the amount of water used being sufficient to form a mixture having the consistency of a heavy paint. The mixture is spread over the roof gravel, for example, with a broom, preferably of the relatively broad push type, whereby said mixture is forced through the gravel to the underlying tar paper to form a solid mass after a drying period. At least one and preferably two water barrier coats, comprised of a properly proportioned mixture of masonry cement, lime and water, is then applied thereatop.

4 Claims, 3 Drawing Figures

POROUS SURFACE SEALING COMPOUND

BACKGROUND OF THE PRESENT INVENTION

Gravel roofs are very popular in many areas of the United States, being less expensive than other types of roofs while being quite durable. However, various weather conditions such as high winds and very heavy rains often displace much of the gravel if the gravel is not sealed in place.

This type of roof is generally constructed of one or more layers of tar paper being fixed in a covering relation to the roof sheathing, the paper is then heavily coated with a roofing tar and the gravel is spread thereatop. To prevent the displacement of the gravel, it is sealed. For many years, the sealing has been accomplished by spraying the gravel. This binds the surface of the gravel coat together and while there is some penetration, it is quite limited and generally within one year's time, the gravel begins to loosen and can actually be picked up and crumbled in one's hand. One of the most widely used compounds employed with this spraying technique is marketed under the tradename "LOCK TITE" and is comprised generally of a synthetic base, a powdered plastic material and lime.

The sealing compound of the present invention is comprised of a properly proportioned mixture of portland cement, sand, calcium aluminate cement and water. The method of applying the mixture includes the use of a broom, preferably of the relatively broad push type whereby the mixture is forced through the gravel to the underlying roofing paper and when dried permanently binds the gravel together and to the roofing paper. At least one and preferably two water barrier coats is then applied thereatop, the water barrier coating being comprised of a mixture of masonry cement, lime and water in proper proporations.

Therefore, one of the principal objects of the present invention is to provide a sealing compound particularly for use on gravel roofs which permanently binds the gravel together in a solid mass and to the underlying roofing paper.

Another object of the invention is to mix the sealing compound with a sufficient amount of water to provide a consistency whereby a broom may be employed to spread the mixture over the surface of the gravel while causing it to penetrate therethrough to the underlying roofing paper.

A further object of the present invention is to apply at least one water barrier coating over the sealed roof after it has set and dried.

DETAILED DESCRIPTION OF THE INVENTION

Figure 1:
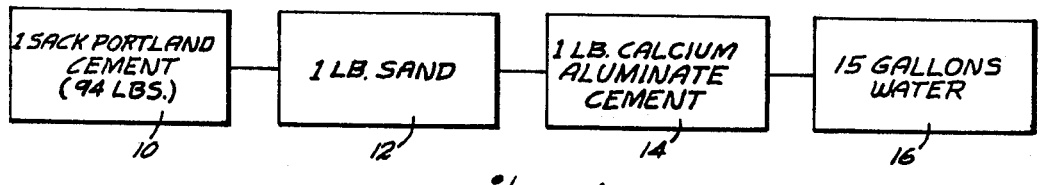
FIG. 1 is a flow diagram indicating the materials and proportions thereof employed in the sealing compound of the present invention in addition to a desirable amount of water for use therewith.
Figure 3:
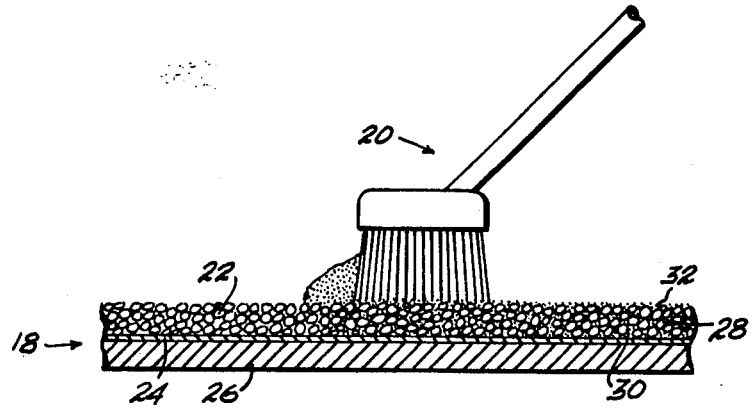
FIG. 3 is a fragmentary cross sectional view of a typical gravel roof with the sealing compound being applied thereto.

With reference to the drawings and particularly to FIG. 1, the sealing compound of the present invention is disclosed with the materials and most desirable proportions thereof employed therein. The compound is disclosed relative to one sack of portland cement which comprises the base, one sack weighing 94 pounds as indicated at 10. One pound of sand as at 12 and one pound of calcium aluminate cement 14 is added to the portland cement, these proportions being considered ideal for bagging and actual usage. As indicated at 16, fifteen gallons of water is mixed with the compound to provide an ideal consistency for spreading on a gravel roof 18, FIG. 3, by means of a push broom 20.

The gravel 22 of roof 18 is disposed atop roofing paper 24 fixed to the roof sheathing 26 in a conventional manner. As indicated at 28, the compound binds the gravel 22 together and penetrates to the roofing paper as at 30 while providing a top coat 32.

Figure 2:
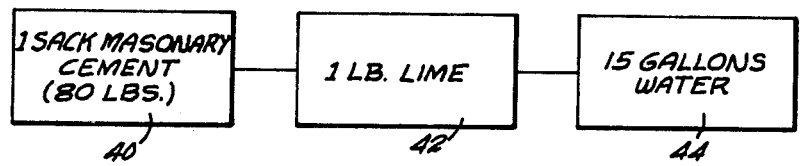
FIG. 2 is a flow diagram indicating the materials and proportions thereof employed in a water barrier mixture to be applied atop a sealed gravel roof, for example.

After the sealed roof is completely dried (three or four days) at least one water barrier coat, FIG. 2, is applied thereatop. The water barrier coat is indicated as proportioned relative to one eighty pound sack of masonry cement 40 to which one pound of lime 42 is added for mixture with approximately fifteen gallons of water 44.

The sealing compound, FIG. 1, comprises a principal part of the invention. The inventor, being in the roofing business for a considerable number of years, devised his sealing compound after dealing with many irate customers after failure within one year or so of commercially available gravel roof sealing compounds.

The sealing compound of the present invention has other applications, for example, it has been found to tightly seal black top driveways after they have aged to a degree where they become pitted and porous which generally occurs in one to two years.

It should be noted that the proportions of FIG. 1, while being considered ideal, may be varied somewhat without impairing the effectiveness of the compound.

What is claimed is:

1. A sealing compound and moisture barrier for use on porous surfaces such as a gravel roof comprising a mixture of a major proportion of portland cement with minor proportions of sand and calcium aluminate cements, for mixture in a predetermined amount of water, said minor proportions being sufficient amounts of sand and calcium aluminate cement, when mixed with said major proportion of portland cement and water, to cause a hardening while drying into a solid mass with the gravel of a gravel roof when applied in a penetrating relation thereto.

2. The sealing compound and moisture barrier as defined in claim 1 wherein said minor proportions comprise approximately one part each of sand and calcium aluminate cement and said major proportion comprises approximately ninety-four parts of portland cement.

3. A mixture comprising the sealing compound and moisture barrier mixture as defined in claim 1 and about 15 gallons of water.

4. A mixture comprising the sealing compound and moisture barrier as defined in claim 2 and comprising about 15 gallons of water for each ninety-four parts of portland cement and one part each of sand and calcium aluminate cement when said parts are measured in pounds.

* * * * *